(12) United States Patent
Purushothaman et al.

(10) Patent No.: US 12,536,049 B2
(45) Date of Patent: Jan. 27, 2026

(54) SYSTEM AND METHOD FOR DYNAMICALLY MAPPING AND ROUTING WORKLOAD REQUIREMENTS TO APPROPRIATE COMPUTING COMPONENTS

(71) Applicant: BANK OF AMERICA CORPORATION, Charlotte, NC (US)

(72) Inventors: Sasidhar Purushothaman, Telangana (IN); Rahul Gunda, Telangana (IN); Jaymala Jadhav, Maharashtra (IN); Ananda Mohana Reddy Kola, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 664 days.

(21) Appl. No.: 17/404,525

(22) Filed: Aug. 17, 2021

(65) Prior Publication Data

US 2023/0058700 A1 Feb. 23, 2023

(51) Int. Cl.
   *G06F 9/50* (2006.01)
(52) U.S. Cl.
   CPC ............ *G06F 9/505* (2013.01); *G06F 9/5038* (2013.01); *G06F 9/5044* (2013.01); *G06F 9/5083* (2013.01)
(58) Field of Classification Search
   None
   See application file for complete search history.

(56) References Cited

U.S. PATENT DOCUMENTS

| | | | |
|---|---|---|---|
| 5,799,286 A | 8/1998 | Morgan et al. | |
| 6,356,880 B1 | 3/2002 | Goossens et al. | |
| 6,574,605 B1 | 6/2003 | Sanders et al. | |
| 6,578,005 B1 | 6/2003 | Lesaint et al. | |
| 7,669,087 B1 * | 2/2010 | Johnsen ................ | G06F 11/008 714/6.32 |
| 8,560,364 B2 | 10/2013 | Vogel et al. | |
| 10,410,178 B2 | 9/2019 | Leary et al. | |
| 10,482,407 B2 | 11/2019 | Tijerina et al. | |
| 10,726,367 B2 | 7/2020 | Theriault et al. | |
| 10,871,988 B1 * | 12/2020 | Gao ........................ | G06F 9/505 |
| 10,936,978 B2 | 3/2021 | Tijerina et al. | |

(Continued)

FOREIGN PATENT DOCUMENTS

GB 2315350 A 1/1998

*Primary Examiner* — Bradley A Teets
*Assistant Examiner* — Melissa A Headly
(74) *Attorney, Agent, or Firm* — Moore & Van Allen PLLC; Anoohya Yarlagadda (57) ABSTRACT

Embodiments of the present invention provide a system for dynamically mapping and routing workload requirements to appropriate computing components. The system is configured for identifying workloads associated with applications of an entity, classifying the workloads based on computational needs associated with the workloads, identifying resources associated with the entity, classifying the resources based on computational capabilities of the resources, performing assessment of the resources and the workloads, assigning each of the workloads to the resources based on performing assessment of the resources and the workloads, receiving real-time workloads associated with the applications, route the real-time workloads to the resources based on the assignment of each of the workloads to the resources.

14 Claims, 7 Drawing Sheets

(56) References Cited

U.S. PATENT DOCUMENTS

| | | |
|---|---|---|
| 11,151,493 B2 | 10/2021 | Auradkar et al. |
| 2002/0010612 A1 | 1/2002 | Smith et al. |
| 2002/0128895 A1 | 9/2002 | Broderick et al. |
| 2002/0188610 A1 | 12/2002 | Spencer, Jr. |
| 2003/0225563 A1 | 12/2003 | Gonos |
| 2004/0006399 A1 | 1/2004 | Klein |
| 2004/0138936 A1 | 7/2004 | Johnson et al. |
| 2004/0162753 A1 | 8/2004 | Vogel et al. |
| 2005/0144025 A1 | 6/2005 | Katz et al. |
| 2011/0173617 A1* | 7/2011 | Gargash ............... G06F 1/3203 718/100 |
| 2017/0083364 A1* | 3/2017 | Zhao ..................... G06F 9/5083 |
| 2019/0220319 A1* | 7/2019 | Parees .................. G06F 9/5027 |
| 2021/0073056 A1* | 3/2021 | Desai .................... G06F 9/5083 |
| 2022/0284359 A1 | 9/2022 | Lopopolo |

\* cited by examiner

```
┌─────────────────────────────────────────────────────────────────────────┐
│ DETERMINE THAT MORE THAN A PREDETERMINED NUMBER OF THE ONE OR MORE     │
│ REAL-TIME WORKLOADS ARE IN A QUEUE AFTER ROUTING THE ONE OR MORE        │
│ REAL-TIME WORKLOADS TO THE ONE OR MORE RESOURCES                        │
│                                   550                                    │
└─────────────────────────────────────────────────────────────────────────┘
                                    ↓
┌─────────────────────────────────────────────────────────────────────────┐
│           SWITCH FROM THE OPTIMAL MODE TO A BALANCING MODE              │
│                                   555                                    │
└─────────────────────────────────────────────────────────────────────────┘
                                    ↓
┌─────────────────────────────────────────────────────────────────────────┐
│ DETERMINE TYPE OF THE ONE OR MORE REAL-TIME WORKLOADS WAITING IN THE    │
│ QUEUE BASED ON PRIOR CLASSIFICATION OF THE ONE OR MORE REAL-TIME        │
│ WORKLOADS                                                                │
│                                   560                                    │
└─────────────────────────────────────────────────────────────────────────┘
                                    ↓
┌─────────────────────────────────────────────────────────────────────────┐
│ RE-ROUTE THE ONE OR MORE REAL-TIME WORKLOADS WAITING IN THE QUEUE TO   │
│ THE ONE OR MORE RESOURCES THAT ARE AVAILABLE BASED ON THE TYPE OF THE   │
│ ONE OR MORE REAL-TIME WORKLOADS                                         │
│                                   565                                    │
└─────────────────────────────────────────────────────────────────────────┘
```

SYSTEM AND METHOD FOR DYNAMICALLY MAPPING AND ROUTING WORKLOAD REQUIREMENTS TO APPROPRIATE COMPUTING COMPONENTS

BACKGROUND

There exists a need for a system that dynamically maps and routes workload requirements to appropriate computing components.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamically mapping and routing workload requirements to appropriate computing components. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies one or more workloads associated with one or more applications of an entity, classifies the one or more workloads based on one or more computational needs associated with the one or more workloads, identifies one or more resources associated with the entity, classifies the one or more resources based on one or more computational capabilities of the one or more resources, performs assessment of the one or more resources and the one or more workloads, assigns each of the one or more workloads to the one or more resources based on performing assessment of the one or more resources and the one or more workloads, receives one or more real-time workloads associated with the one or more applications, classifies the one or more real-time workloads based on the one or more computational needs associated with the one or more workloads, and operates in an optimal mode and route the one or more real-time workloads to the one or more resources based on the classification of the one or more real-time workloads and the assignment each of the one or more workloads to the one or more resources.

In some embodiments, the present invention determines the one or more computational needs associated with the one or more workloads and the one or more real-time workloads based on identifying complexity of execution associated with the one or more workloads and the one or more real-time workloads, identifying resource intensive nature of the one or more workloads and the one or more real-time workloads, and identifying cycle time associated with the one or more workloads and the one or more real-time workloads.

In some embodiments, the present invention determines the one or more computational capabilities associated with the one or more resources based on determining availability of the one or more resources, determining stability of the one or more resources, and determining redundancy capability associated with the one or more resources.

In some embodiments, the present invention determines that more than a predetermined number of the one or more real-time workloads are in a queue after routing the one or more real-time workloads to the one or more resources, switches from the optimal mode to a balancing mode, and re-routes the one or more real-time workloads waiting in the queue to the one or more resources that are available.

In some embodiments, the present invention performs assessment of the one or more resources and the one or more workloads based on converting the one or more workloads into one or more workload units, converting the one or more resources into one or more resource units, determining performance efficiency of each of the one or more resource units against each of the one or more workload units, and determining an efficient resource unit of the one or more resource units for each of the one or more workload units.

In some embodiments, the one or more workload units are Millions of Instructions Per Second (MIPS) or Floating point Operations Per Second (FLOPS).

In some embodiments, the one or more resources are cloud computing services, wherein the one or more resources are at least one of entity resources and third party resources.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more computing units to implement one or more workloads. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution.

As described herein, the term "computing resources" or "resources" may be any resources that provide computational capabilities to the entity. In some embodiments of the invention, the computing resources may be cloud computing resources. In some embodiments, the computing resources may be internal entity resources (e.g., internal cloud service). In some embodiments, the computing resources may be external entity resources (e.g., third party cloud services).

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Conventional systems do not have the capability to route one or more workloads associated with one or more applications within an entity to appropriate computing resources. As such, a workload may be routed to a low performing computing resource, thereby reducing the efficiency of the computing resource and an application associated with the workload. Therefore, there exists a need for a system that dynamically maps and routes one or more workloads associated with the one or more applications to appropriate computing resources.

Figure 1:
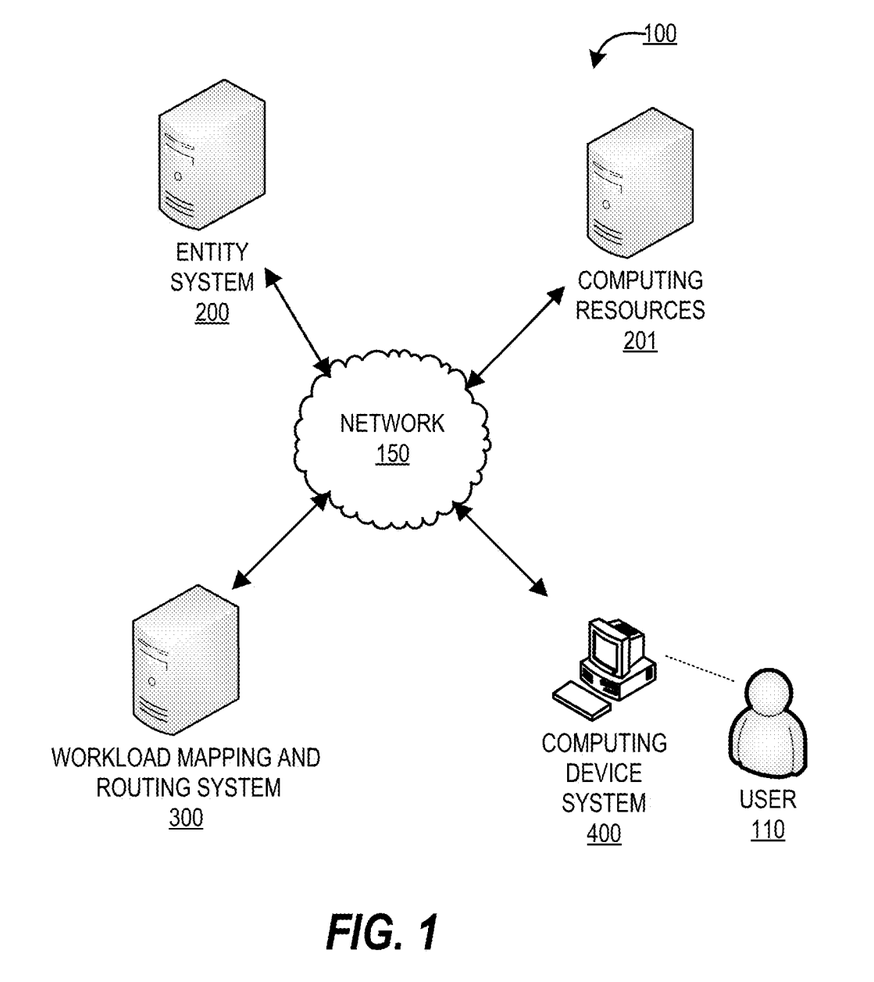
FIG. 1 provides a block diagram illustrating a system environment for dynamically mapping and routing workload requirements to appropriate computing components, in accordance with an embodiment of the invention.

FIG. 1 provides a block diagram illustrating a system environment 100 for dynamically mapping and routing workload requirements to appropriate computing components, in accordance with an embodiment of the invention. As illustrated in FIG. 1, the environment 100 includes a workload mapping and routing system 300, an entity system 200, one or more computing resources 201 (e.g., entity computing resources and/or external computing resources) and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., resource managers, application developers, software engineers, application testers, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more computing resources 201 to execute, store, process, and/or implement one or more workloads, where the one or more workloads may be associated with one or more applications that are employed for performing one or more organizational activities. In some such embodiments, the one or more computing resources 201 provide the computational power and capabilities to allow the entity to execute, store, process, and/or implement the one or more workloads.

The workload mapping and routing system 300 is a system of the present invention for performing one or more process steps described herein. In some embodiments, the workload mapping and routing system 300 may be an independent system. In some embodiments, the workload mapping and routing system 300 may be a part of the entity system 200.

The workload mapping and routing system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the workload mapping and routing system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the workload mapping and routing system 300, and/or entity system 200 across the network 150.

Figure 2:
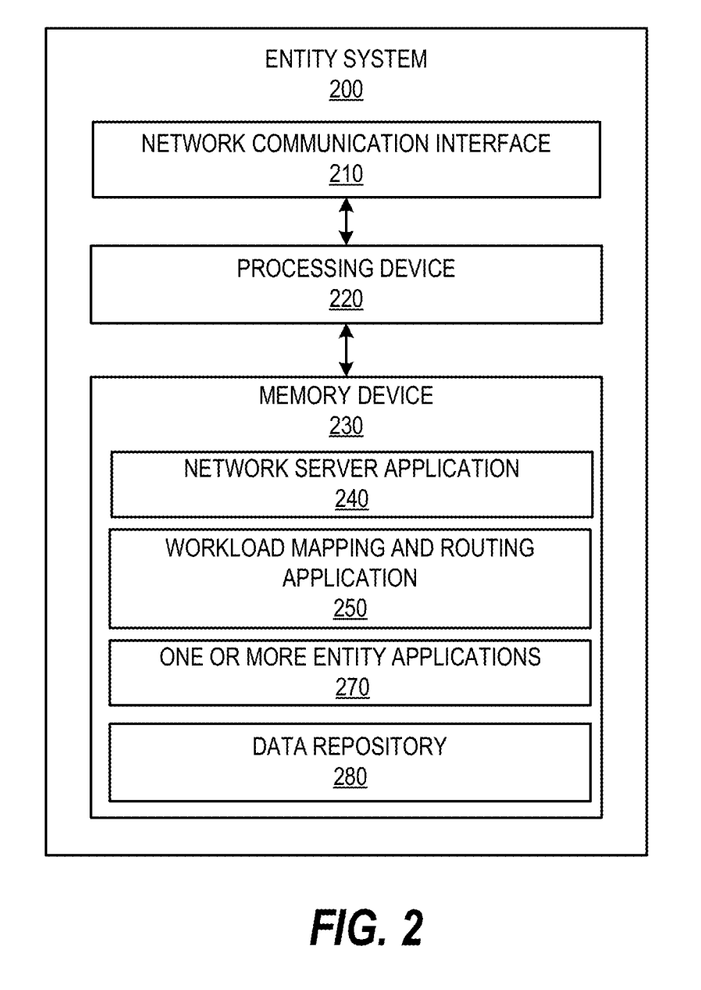
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a workload mapping and routing application 250, one or more entity applications 270, and a data repository 280 comprising historical activity data associated with the entity and data accessed, retrieved, and/or computed by the entity system 200. The one or more entity applications 270 may be any applications developed, supported, maintained, utilized, and/or controlled by the entity. The computer-executable program code of the network server application 240, the workload mapping and routing application 250, the one or more entity applications 270 to perform certain logic, data-extraction, and data-storing functions of the entity system 200 described herein, as well as communication functions of the entity system 200.

The network server application 240, the workload mapping and routing application 250, and the one or more entity applications 270 are configured to store data in the data repository 280 or to use the data stored in the data repository 280 when communicating through the network communication interface 210 with the workload mapping and routing system 300, and/or the computing device system 400 to perform one or more process steps described herein. In some embodiments, the entity system 200 may receive instructions from the workload mapping and routing system 300 via the workload mapping and routing application 250 to perform certain operations. The workload mapping and routing application 250 may be provided by the workload mapping and routing system 300. The one or more entity applications 270 may be any of the applications used, created, modified, facilitated, and/or managed by the entity system 200.

Figure 3:
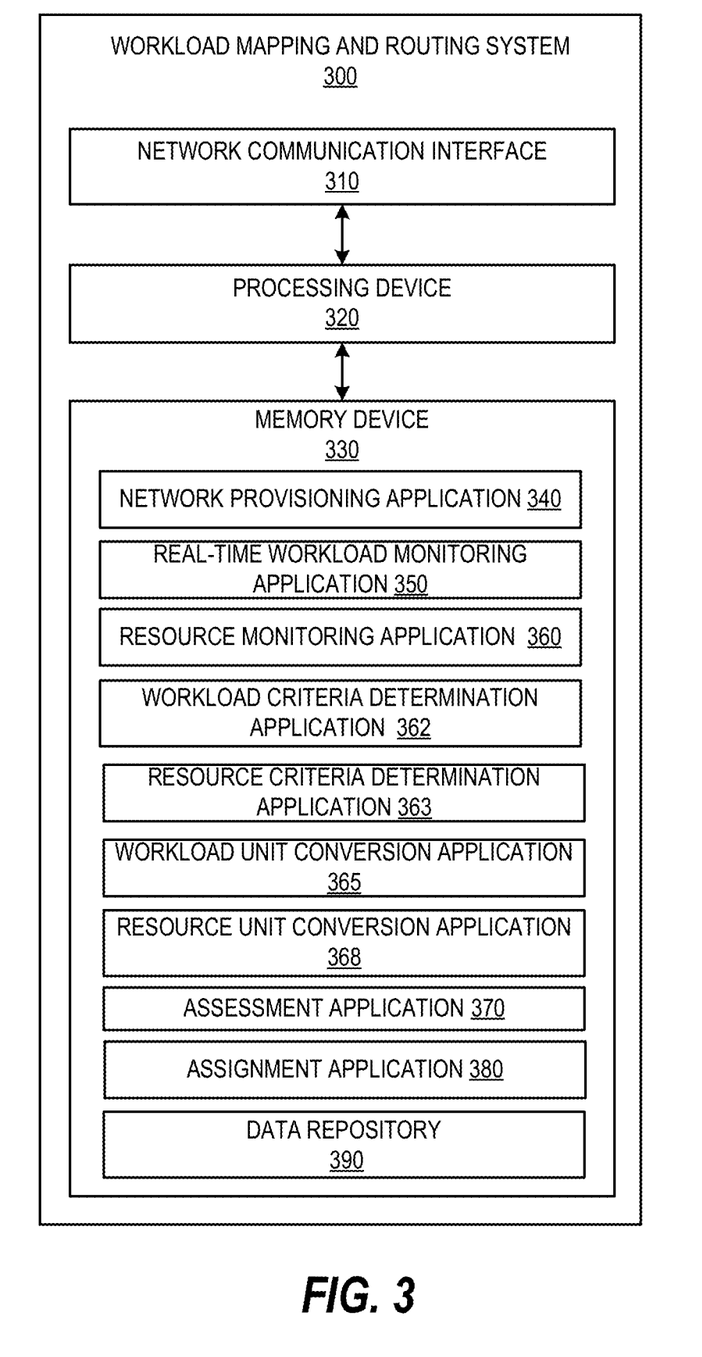
FIG. 3 provides a block diagram illustrating a workload mapping and routing system 300 of FIG. 1, in accordance with an embodiment of the invention.

FIG. 3 provides a block diagram illustrating the workload mapping and routing system 300 in greater detail, in accordance with embodiments of the invention. As illustrated in FIG. 3, in one embodiment of the invention, the workload mapping and routing system 300 includes one or more processing devices 320 operatively coupled to a network communication interface 310 and a memory device 330. In certain embodiments, the workload mapping and routing system 300 is operated by an entity, such as a financial institution. In some embodiments, the workload mapping and routing system 300 is owned or operated by the entity of the entity system 200. In some embodiments, the workload mapping and routing system 300 may be an independent system. In alternate embodiments, the workload mapping and routing system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the workload mapping and routing system 300 described herein. For example, in one embodiment of the workload mapping and routing system 300, the memory device 330 includes, but is not limited to, a network provisioning application 340, a real-time workload monitoring application 350, a resource monitoring application 360, a workload criteria determination application 362, a resource criteria determination application 363, a workload unit conversion application 365, a resource unit conversion application 368, an assessment application 370, an assignment application 380, and a data repository 390 comprising application data 393 and any other data processed or accessed by one or more applications in the memory device 330. The computer-executable program code of the network provisioning application 340, the real-time workload monitoring application 350, the resource monitoring application 360, the workload criteria determination application 362, the resource criteria determination application 363, the workload unit conversion application 365, the resource unit conversion application 368, the assessment application 370, and the assignment application 380 may instruct the processing device 320 to perform certain logic, data-processing, and data-storing functions of the workload mapping and routing system 300 described herein, as well as communication functions of the workload mapping and routing system 300.

The network provisioning application 340, the real-time workload monitoring application 350, the resource monitoring application 360, the workload criteria determination application 362, the resource criteria determination application 363, the workload unit conversion application 365, the resource unit conversion application 368, the assessment application 370, and the assignment application 380 are configured to invoke or use the data in the data repository 390 when communicating through the network communication interface 310 with the entity system 200, and/or the computing device system 400. In some embodiments, the network provisioning application 340, the real-time workload monitoring application 350, the resource monitoring application 360, the workload criteria determination application 362, the resource criteria determination application 363, the workload unit conversion application 365, the resource unit conversion application 368, the assessment application 370, and the assignment application 380 may store the data extracted or received from the entity system 200, and the computing device system 400 in the data repository 390. In some embodiments, the network provisioning application 340, the real-time workload monitoring application 350, the resource monitoring application 360, the workload criteria determination application 362, the resource criteria determination application 363, the workload unit conversion application 365, the resource unit conversion application 368, the assessment application 370, and the assignment application 380 may be a part of a single application.

Figure 4:
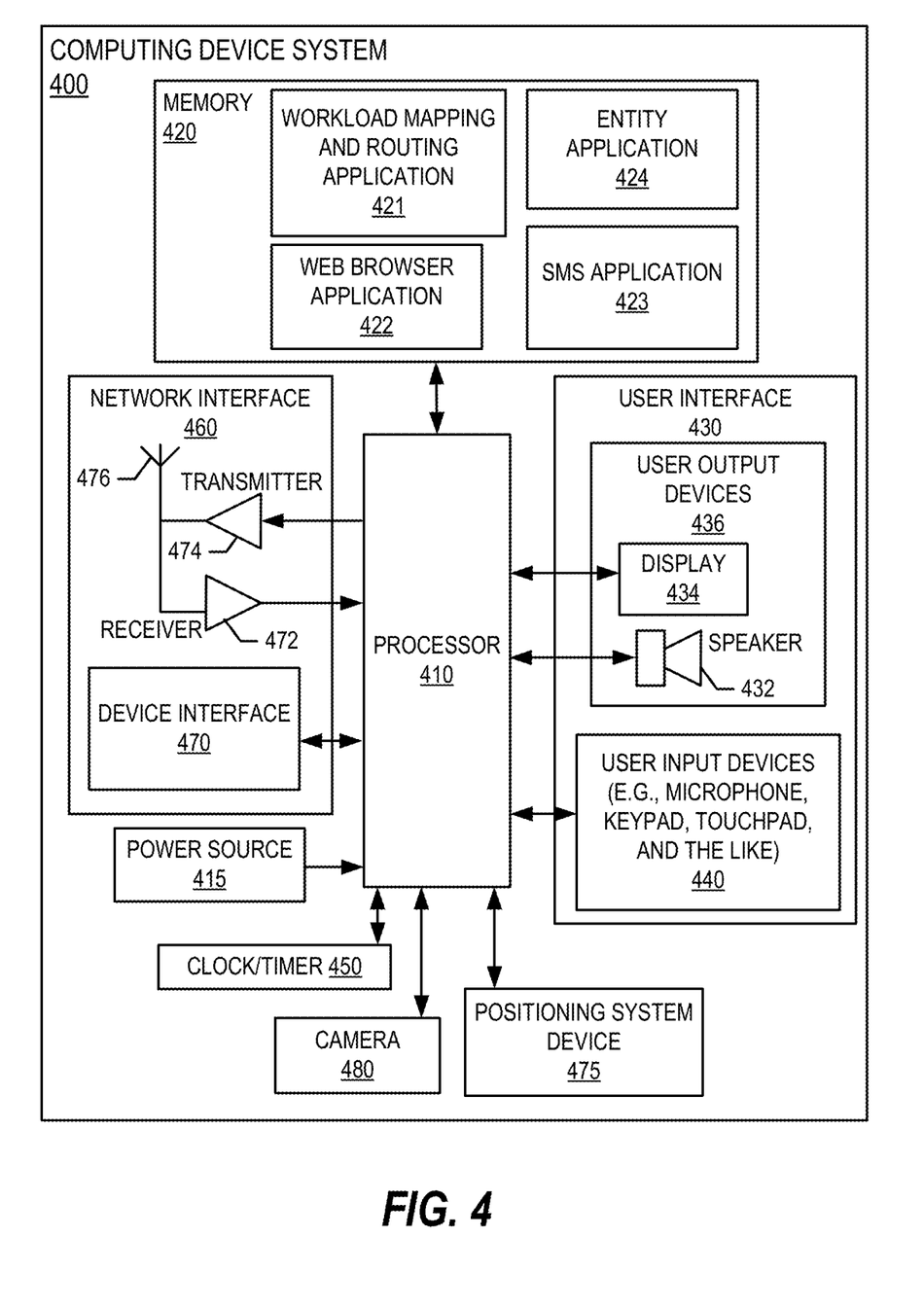
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a workload mapping and routing application 421, entity application 424. These applications also typically instructions to a graphical user interface (GUI) on the display 430 that allows the user 110 to interact with the entity system 200, the workload mapping and routing system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the workload mapping and routing application 421 provided by the workload mapping and routing system 300 allows the user 110 to access the workload mapping and routing system 300. In some embodiments, the entity application 424 provided by the entity system 200 and the workload mapping and routing application 421 allow the user 110 to access the functionalities provided by the workload mapping and routing system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5A:
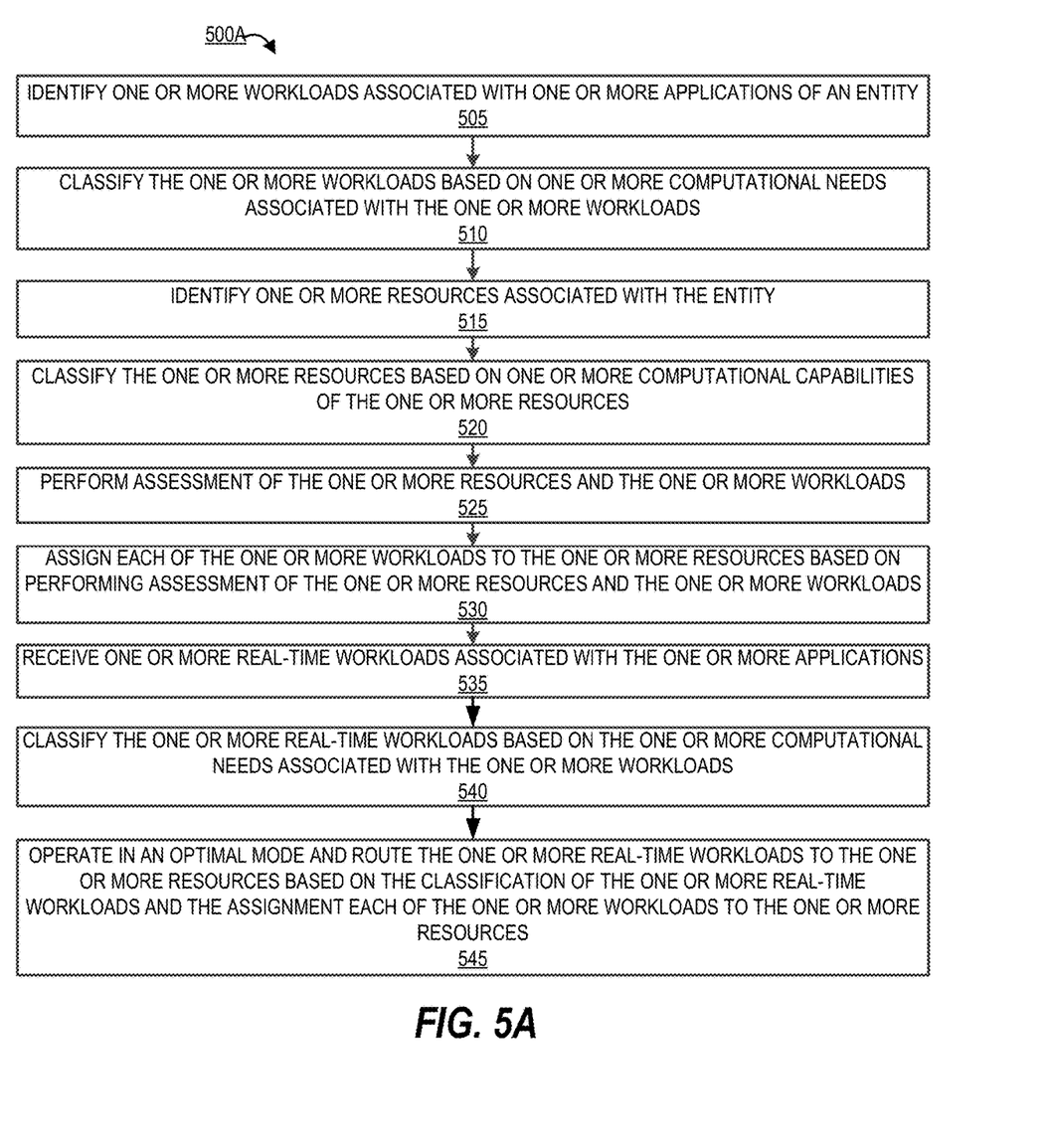
FIG. 5A provides a process flow for dynamically mapping and routing workload requirements to appropriate computing components, in accordance with an embodiment of the invention.

FIG. 5A provides a process flow for dynamically mapping and routing workload requirements to appropriate computing components, in accordance with an embodiment of the invention. As shown in block 505, the system identifies one or more workloads associated with one or more applications of an entity. In some embodiments, the one or more workloads may be associated with one or more components of one or more applications associated with the entity. In some embodiments, the one or more workloads may be associated with one or more functionalities provided by the one or more applications. In some embodiments, the one or more applications may be any applications utilized by the entity to perform one or more organizational activities associated with the entity. For example, the system may identify that the one or more applications may have static content workload, search workload, active directory workload, application functionality workload, web application workload, database workload, or the like.

As shown in block 510, the system classifies the one or more workloads based on one or more computational needs associated with the one or more workloads. In some embodiments, the system determine the one or more computational needs associated with the one or more workloads based on identifying complexity of execution associated with the one or more workloads, identifying resource intensive nature of the one or more workloads, and identifying cycle time associated with the one or more workloads. In one example, the system may identify that a workload of an application involves executing too many reads, logics, and/or multiple iterations and the complexity of such workload may be high and may need higher computational power. In another example, the system may identify that a workload of an application may cause higher CPU utilization, such workload is classified as a resource intensive workload. In another example, the system may determine that a workload of an application is not optimized and comprises multiple variables or arrays that are developed without properly adhering to coding standards, such workload may be classified as a workload which needs lot of cycle time for execution.

As shown in block 515, the system identifies one or more resources associated with the entity. The one or more resources may be any computing resources. In some embodiments, the one or more resources may be cloud computing resources. In some embodiments, the one or more resources may be entity resources. For example, the entity may maintain an internal cloud services that is developed, managed, and/or maintained by the entity. In some embodiments, the one or more resources may be third party entity resources (e.g., third party cloud computing services).

As shown in block 520, the system classifies the one or more resources based on one or more computational capabilities of the one or more resources. The system determines the one or more computational capabilities associated with the one or more resources based on determining availability of the one or more resources, determining stability of the one or more resources, and determining redundancy capability associated with the one or more resources.

As shown in block 525, the system performs assessment of the one or more resources and the one or more workloads. The system performs assessment of the one or more resources and the one or more workloads based on converting the one or more workloads into one or more workload units, converting the one or more resources into one or more resource units, determining performance efficiency of each of the one or more resource units against each of the one or more workload units, and determining an efficient resource unit of the one or more resource units for each of the one or more workload units. In some embodiments, the one or more workload units are Millions of Instructions Per Second (MIPS). The MIPS workload unit is computer power that may be required to perform Millions of Instructions Per Second (MIPS). In some embodiments, the one or more workload units are Floating point Operations Per Second (FLOPS). The FLOPS workload unit is computer power that may be required to perform Floating point Operations Per Second (FLOPS). The one or more workload units may define the processor speed, flexibility, video need, disk need, memory speed, or the like required to execute the one or more workloads. In some embodiments, the system may configure size of the workload units. For example, the system breaks down the one or more workloads such that each workload takes 'n' units of computer power. The system then converts the one or more resources into the one or more resource units. For example, the system may determine that 'X' units of combined computational power is available for the entity from four computing resources, the system may determine that 'g1' units of computational power is associated with computing resource '1,' 'g2' units of computational power is associated with computing resource '2,' 'g3' units of computational power is associated with computing resource '3,' and 'g4' units of computational power is associated with computing resource '4,' where sum of 'g1,' 'g2,' 'g3,' and 'g4' is equal to X. The system determines performance efficiency of each of the one or more resource units against each of the one or more workload unit and determines an efficient resource unit of the one or more resource units for each of the one or more workload units. For example, a workload unit 'B1' is executed on available resource units and may determine that resource unit 'g1' is most efficient resource unit for executing workload unit 'B1.'

As shown in block 530, the system assigns each of the one or more workloads to the one or more resources based on performing assessment of the one or more resources and the one or more workloads. Continuing with the previous example, the system may assign all workload units such as workload unit 'B1' to resource unit 'g1.'

As shown in block 535, the system receives one or more real-time workloads associated with the one or more applications. After performing assessment and defining the routing of workload units to resource units, the system may receive real-time workloads associated with the one or more applications. As shown in block 540, the system classifies the one or more real-time workloads based on the one or more computational needs associated with the one or more workloads. In some embodiments, the system determines the one or more computational needs associated with the one or more real-time workloads based on identifying complexity of execution associated with the one or more real-time workloads, identifying resource intensive nature of the one or more real-time workloads, and identifying cycle time associated with the one or more real-time workloads.

As shown in block 545, the system operates in an optimal mode and route the one or more real-time workloads to the one or more resources based on the classification of the one or more real-time workloads and the assignment each of the one or more workloads to the one or more resources. The system may receive real-time workloads associated with the one or more applications based on the assessment and assignment performed in block 525 and block 530. In optimal mode of operation, the system routes the one or more real-time workloads to the one or more resources such that the efficiency of executing the one or more real-time workloads is high. Continuing with the previous example, all workload units such as workload unit 'B1' are routed to resource unit 'g1' such that the workload units are executed efficiently. In some embodiments, the system may route the one or more real-time workloads that are associated with confidential and secure information to an internal computing resource irrespective of the efficiency associated with the internal computing resource.

Figure 5B:
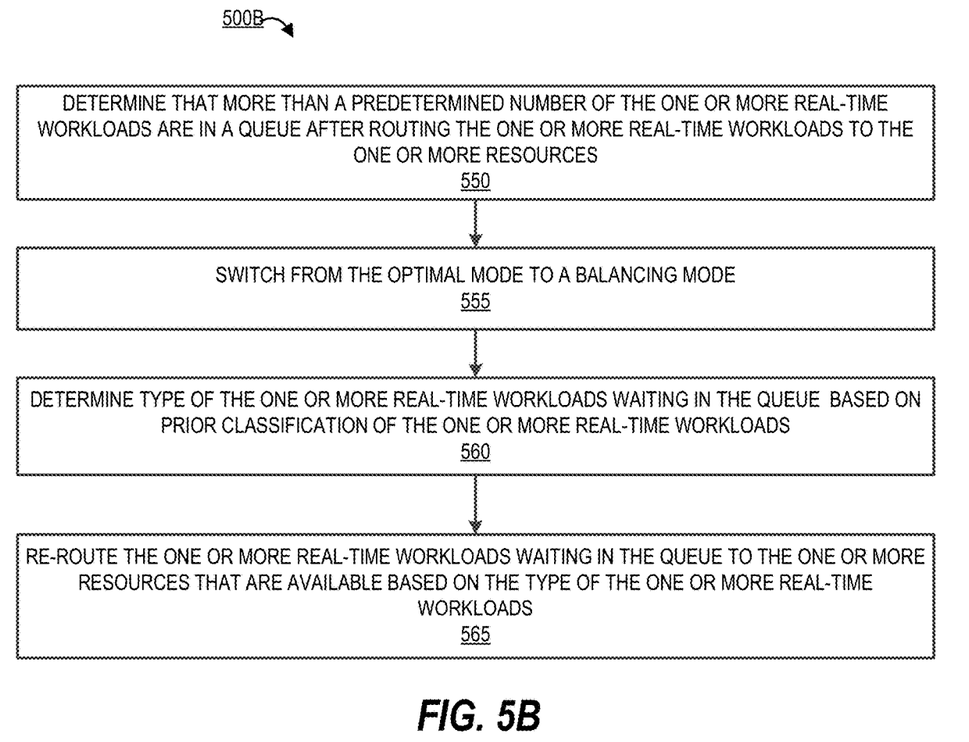
FIG. 5B provides a process flow for dynamically switching mode of operation associated with routing workload requirements to appropriate computing components, in accordance with an embodiment of the invention.

FIG. 5B provides a process flow for dynamically switching mode of operation associated with routing workload requirements to appropriate computing components, in accordance with an embodiment of the invention.

As shown in block 550, the system determines that more than a predetermined number of the one or more real-time workloads are in a queue after routing the one or more real-time workloads to the one or more resources. For example, the system may determine that more than 'X' number of the one or more real-time workloads are in a queue waiting to be executed by a computing resource 'A,' where computing resource 'A' is the resource that is capable of executing the 'X' number of the one or more real-time workloads at high efficiency.

As shown in block 555, the system switches from the optimal mode to a balancing mode. In balancing mode of operation, the system routes the one or more real-time workloads waiting in the queue to be executed by a high efficiency computing resource to other moderately efficient computing resources that are available.

As shown in block 560, the system determines type of the one or more real-time workloads waiting in the queue based on prior classification of the one or more real-time workloads. As shown in block 565, the system re-routes the one or more real-time workloads waiting in the queue to the one or more resources that are available based on the type of the one or more real-time workloads. For example, the system may determine that a workload waiting in the queue is a less intensive workload and may reroute the workload to a computing resource that has moderate efficiency in executing such workloads.

Figure 6:
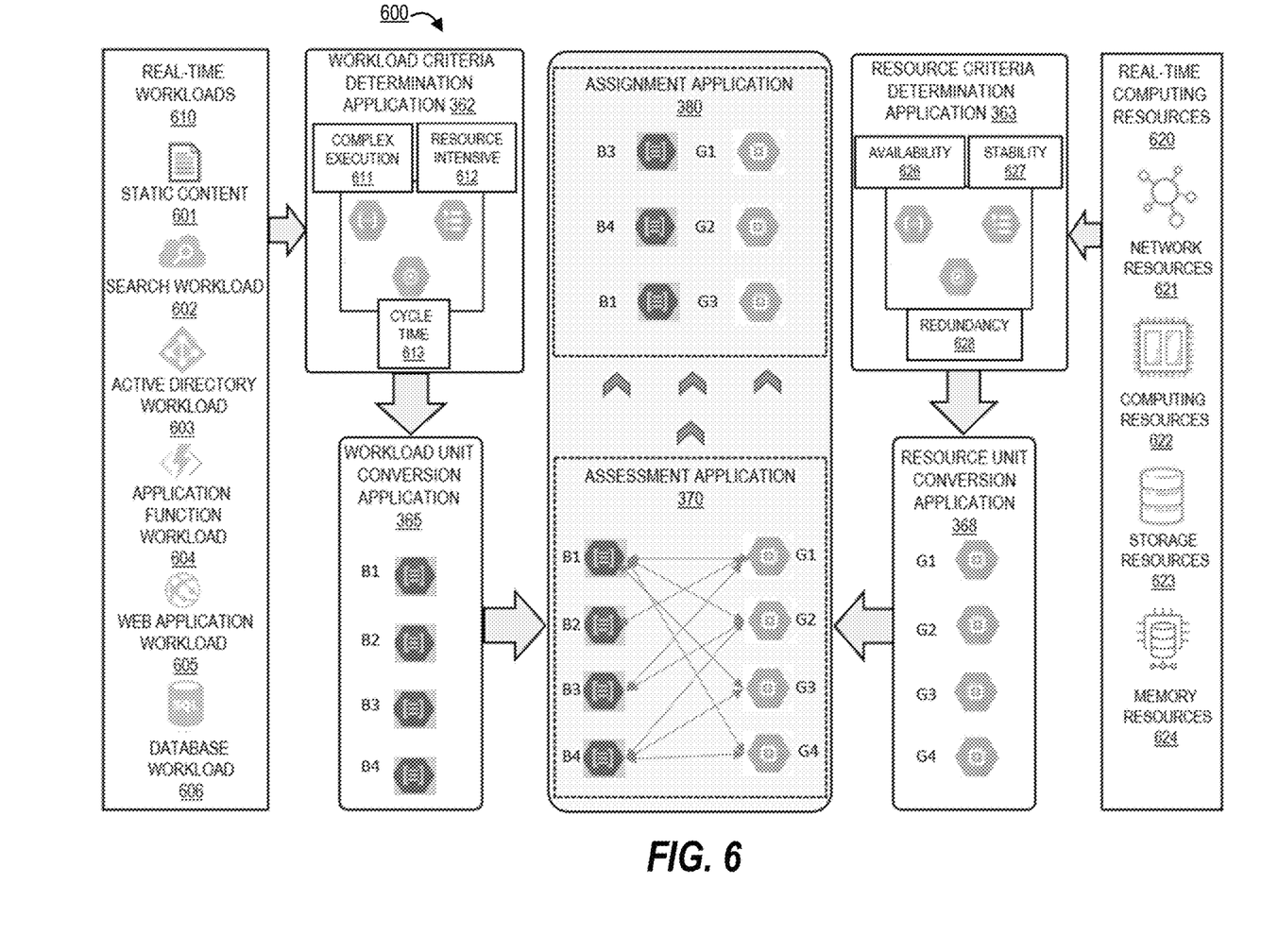
FIG. 6 provides a block diagram dynamically mapping and routing workload requirements to appropriate computing components, in accordance with an embodiment of the invention.

FIG. 6 provides a block diagram dynamically mapping and routing workload requirements to appropriate computing components, in accordance with an embodiment of the invention. As shown, the real-time workloads may comprise static content workload 601, search workload 602, active directory workload 603, application function workload 604, web application workload 605, database workload 606, and any other workloads associated with the one or more applications associated with the entity. After receiving the one or more real-time workloads, the workload criteria determination application 362 classifies the one or more real-time workloads 610 based on one or more factors comprising complex execution 611, resource intensive nature 612, and cycle time 613. In response to classifying the one or more real-time workloads 610, the workload unit conversion application 365 converts the one or more real-time workloads 610 into one or more workload units (e.g., B1, B2, B3, and B4). As shown, the one or more real-time computing resources 620 may comprise network resources 621, computing resources 622, storage resources 623, memory resources 624, and the like. The resource criteria determination application 363 classifies the one or more real-time computing resources 620 based on the availability 626, stability 627, and redundancy 628. After classifying the one or more real-time computing resources 620, the resource unit conversion application 368 converts the one or more real-time computing resources 620 to one or more resource units (e.g., G1, G2, G3, and G4). The assessment application 370 may assess the one or more resource units and the one or more workloads units. As shown, the assessment application executes the workload unit 'B1' on resource unit 'G1,' resource unit 'G2,' resource unit 'G3,' and resource unit 'G4' and may determine that resource unit 'G3' is the most efficiency resource for executing the workload unit 'B1.' Similarly, the assessment application 370 may then determine that resource unit 'G2' is the most efficiency resource for executing the workload unit 'B4' and resource unit 'G1' is the most efficiency resource for executing the workload unit 'B3.' Based on the assessment, the assignment application 380 assigns the workload unit 'B1' to resource unit 'G3,' workload unit 'B4' to resource unit 'G2,' and workload unit 'B3' to resource unit 'G1.' The assignment application 380 may assign all future workloads based on these assignment of workloads to appropriate computing resources. In some embodiments, the system may perform assessment, assignment, and routing of real-time workloads together instead of performing assessment and assignment steps before receiving the real-time workloads. It should be understood that the examples shown and described herein are for illustrative purposes only and do not delineate the scope of the invention.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamically mapping and routing workload requirements to appropriate computing components, the system comprising:

at least one network communication interface;
at least one non-transitory storage device; and
at least one processing device coupled to the at least one non-transitory storage device and the at least one network communication interface, wherein the at least one processing device is configured to:
identify one or more workloads associated with one or more functionalities provided by the one or more applications of an entity;
classify the one or more workloads based on one or more computational needs associated with the one or more workloads;
identify one or more resources associated with the entity;
classify the one or more resources based on one or more computational capabilities of the one or more resources;
perform assessment of the one or more resources and the one or more workloads by:
converting the one or more workloads into one or more workload units;
converting the one or more resources into one or more resource units;
determining performance efficiency of each of the one or more resource units against each of the one or more workload units; and
determining an efficient resource unit corresponding to a first resource of the one or more resource units for each of the one or more workload units based on the performance efficiency;
assign each of the one or more workloads to the one or more resources based on performing assessment of the one or more resources and the one or more workloads;

receive one or more real-time workloads associated with the one or more applications;

classify the one or more real-time workloads based on the one or more computational needs associated with the one or more workloads;

operate in a first mode to route the one or more real-time workloads to the first resource of the one or more resources based on the classification of the one or more real-time workloads and the assignment of each of the one or more workloads to the one or more resources, wherein operating in the first mode maximizes efficiency of execution of the one or more real-time workloads;

determine that more than a predetermined number of the one or more real-time workloads are in a queue after routing the one or more real-time workloads to the one or more resources; and in response to determining that more than the predetermined number of the one or more real-time workloads are in the queue after routing the one or more real-time workloads to the one or more resources, switch from the first mode of operation to a second mode of operation to re-route the one or more real-time workloads waiting in the queue to be executed by the first resource to the one or more resources that are available, wherein operating in the second mode of operation minimizes wait time of the one or more real-time workloads in the queue.

2. The system of claim 1, wherein the at least one processing device is configured to determine the one or more computational needs associated with the one or more workloads and the one or more real-time workloads based on:

identifying a category of complexity of execution associated with the one or more workloads and the one or more real-time workloads;

identifying resource intensive nature of the one or more workloads and the one or more real-time workloads; and identifying cycle time associated with the one or more workloads and the one or more real-time workloads.

3. The system of claim 1, wherein the at least one processing device is configured to determine the one or more computational capabilities associated with the one or more resources based on:

determining availability of the one or more resources;

determining stability of the one or more resources; and determining redundancy capability associated with the one or more resources.

4. The system of claim 1, wherein the one or more workload units are Millions of Instructions Per Second (MIPS) or Floating point Operations Per Second (FLOPS).

5. The system of claim 1, wherein the one or more resources are cloud computing services, wherein the one or more resources are at least one of entity resources and third party resources.

6. A computer program product for dynamically mapping and routing workload requirements to appropriate computing components, the computer program product comprising a non-transitory computer-readable storage medium having computer executable instructions for causing a computer processor to perform the steps of:

identifying one or more workloads associated with one or more functionalities provided by the one or more applications of an entity;

classifying the one or more workloads based on one or more computational needs associated with the one or more workloads;

identifying one or more resources associated with the entity;

classifying the one or more resources based on one or more computational capabilities of the one or more resources;

performing assessment of the one or more resources and the one or more workloads by:

converting the one or more workloads into one or more workload units;

converting the one or more resources into one or more resource units;

determining performance efficiency of each of the one or more resource units against each of the one or more workload units; and determining an efficient resource unit of the one or more resource units for each of the one or more workload units based on the performance efficiency;

assigning each of the one or more workloads to the one or more resources based on performing assessment of the one or more resources and the one or more workloads;

receiving one or more real-time workloads associated with the one or more applications;

classifying the one or more real-time workloads based on the one or more computational needs associated with the one or more workloads;

operating in a first mode to route the one or more real-time workloads to the first resource of the one or more resources based on the classification of the one or more real-time workloads and the assignment of each of the one or more workloads to the one or more resources, wherein operating in the first mode maximizes efficiency of execution of the one or more real-time workloads;

determining that more than a predetermined number of the one or more real-time workloads are in a queue after routing the one or more real-time workloads to the one or more resources; and in response to determining that more than the predetermined number of the one or more real-time workloads are in the queue after routing the one or more real-time workloads to the one or more resources, switching from the first mode of operation to a second mode of operation to re-route the one or more real-time workloads waiting in the queue to be executed by the first resource to the one or more resources that are available, wherein operating in the second mode of operation minimizes wait time of the one or more real-time workloads in the queue.

7. The computer program product of claim 6, wherein the computer executable instructions cause the computer processor to perform the step of determining the one or more computational needs associated with the one or more workloads and the one or more real-time workloads based on:

identifying a category of complexity of execution associated with the one or more workloads and the one or more real-time workloads;

identifying resource intensive nature of the one or more workloads and the one or more real-time workloads; and identifying cycle time associated with the one or more workloads and the one or more real-time workloads.

8. The computer program product of claim 6, wherein the computer executable instructions cause the computer processor to perform the step of determining the one or more computational capabilities associated with the one or more resources based on:

determining availability of the one or more resources;

determining stability of the one or more resources; and determining redundancy capability associated with the one or more resources.

9. The computer program product of claim 6, wherein the one or more workload units are Millions of Instructions Per Second (MIPS) or Floating point Operations Per Second (FLOPS).

10. The computer program product of claim 6, wherein the one or more resources are cloud computing services, wherein the one or more resources are at least one of entity resources and third party resources.

11. A computer implemented method for dynamically mapping and routing workload requirements to appropriate computing components, wherein the method comprises:

identifying one or more workloads associated with one or more functionalities provided by the one or more applications of an entity;

classifying the one or more workloads based on one or more computational needs associated with the one or more workloads;

identifying one or more resources associated with the entity;

classifying the one or more resources based on one or more computational capabilities of the one or more resources;

performing assessment of the one or more resources and the one or more workloads by:

converting the one or more workloads into one or more workload units;

converting the one or more resources into one or more resource units;

determining performance efficiency of each of the one or more resource units against each of the one or more workload units; and determining an efficient resource unit of the one or more resource units for each of the one or more workload units based on the performance efficiency;

assigning each of the one or more workloads to the one or more resources based on performing assessment of the one or more resources and the one or more workloads;

receiving one or more real-time workloads associated with the one or more applications;

classifying the one or more real-time workloads based on the one or more computational needs associated with the one or more workloads;

operating in a first mode to route the one or more real-time workloads to the first resource of the one or more resources based on the classification of the one or more real-time workloads and the assignment of each of the one or more workloads to the one or more resources, wherein operating in the first mode maximizes efficiency of execution of the one or more real-time workloads;

determining that more than a predetermined number of the one or more real-time workloads are in a queue after routing the one or more real-time workloads to the one or more resources; and in response to determining that more than the predetermined number of the one or more real-time workloads are in the queue after routing the one or more real-time workloads to the one or more resources, switching from the first mode of operation to a second mode of operation to re-route the one or more real-time workloads waiting in the queue to be executed by the first resource to the one or more resources that are available, wherein operating in the second mode of operation minimizes wait time of the one or more real-time workloads in the queue.

12. The computer implemented method of claim 11, wherein determining the one or more computational needs associated with the one or more workloads and the one or more real-time workloads is based on:

identifying a category of complexity of execution associated with the one or more workloads and the one or more real-time workloads;

identifying resource intensive nature of the one or more workloads and the one or more real-time workloads; and identifying cycle time associated with the one or more workloads and the one or more real-time workloads.

13. The computer implemented method of claim 11, wherein determining the one or more computational capabilities associated with the one or more resources is based on:

determining availability of the one or more resources;

determining stability of the one or more resources; and determining redundancy capability associated with the one or more resources.

14. The computer implemented method of claim 11, wherein the one or more workload units are Millions of Instructions Per Second (MIPS) or Floating point Operations Per Second (FLOPS).

\* \* \* \* \*